US008885611B2

(12) United States Patent
Mella et al.

(10) Patent No.: US 8,885,611 B2
(45) Date of Patent: Nov. 11, 2014

(54) APPARATUS, METHOD AND COMPUTER PROGRAM PRODUCT PROVIDING UPLINK GAIN FACTOR FOR HIGH SPEED UPLINK PACKET ACCESS

(75) Inventors: Perttu Mella, Lepsama (FI); Karri Ranta-Aho, Espoo (FI)

(73) Assignee: Nokia Corporation, Espoo (FI)

(*) Notice: Subject to any disclaimer, the term of this patent is extended or adjusted under 35 U.S.C. 154(b) by 627 days.

(21) Appl. No.: 12/519,754

(22) PCT Filed: Dec. 20, 2007

(86) PCT No.: PCT/IB2007/004040
§ 371 (c)(1),
(2), (4) Date: Jul. 27, 2010

(87) PCT Pub. No.: WO2008/081278
PCT Pub. Date: Jul. 10, 2008

(65) Prior Publication Data
US 2011/0038305 A1    Feb. 17, 2011

Related U.S. Application Data

(60) Provisional application No. 60/875,965, filed on Dec. 20, 2006.

(51) Int. Cl.
*H04W 4/00*     (2009.01)
*H04B 7/216*    (2006.01)
(Continued)

(52) U.S. Cl.
CPC ............ *H04W 52/146* (2013.01); *H04W 52/16* (2013.01); *H04W 52/267* (2013.01); *H04W 52/286* (2013.01)
USPC ........... 370/332; 370/333; 370/335; 370/342; 455/24; 455/69; 455/136

(58) Field of Classification Search
CPC .............. H04W 52/52; H04B 7/14435; H04B 7/15578; H04B 10/294; H03G 3/005
USPC .............. 370/332–333, 335, 342; 455/24, 69, 455/136, 138, 239.1, 240.1, 355
See application file for complete search history.

(56) References Cited

U.S. PATENT DOCUMENTS

| 7,251,266 B2 | 7/2007 | Raaf ............................. 375/146 |
| 2002/0191582 A1* | 12/2002 | Miya et al. .................... 370/342 |

(Continued)

FOREIGN PATENT DOCUMENTS

| CN | 1855752 A | 11/2006 |
| CN | 101558578 B | 1/2013 |

(Continued)

OTHER PUBLICATIONS

TSG-RAN WG1 Meeting #40, Phoenix, AZ, USA, Feb. 1-18, 2005, Gain Factor setting for E-DCH, Samsung, pp. 1-8.*

(Continued)

*Primary Examiner* — Un C Cho
*Assistant Examiner* — Jeremy Costin
(74) *Attorney, Agent, or Firm* — Harrington & Smith

(57) ABSTRACT

Apparatus, methods and computer program products operate a radio network controller in a wireless communications system to determine a factor to be used by user equipment operative in the wireless communications network to determine a gain factor for an E-TFC based on the gain factor of a reference E-TFC; and to signal the factor to the user equipment. The radio network controller may select the factor based on at least one criterion. In another aspect, apparatus, methods and computer program products operate user equipment to receive a factor from a wireless communications network, and to use the factor transmitted by the wireless communications network to determine a gain factor that relates a data signal to be transmitted by the user equipment in a data channel and a control signal transmitted by the electronic device in a control channel, where the control signal transmitted in the control channel carries information for use in receiving the data signal. In additional aspects, the user equipment is further configured to select a formula for use in determining the gain factor in dependence on signaling received from the wireless communications network.

20 Claims, 4 Drawing Sheets

(51) Int. Cl.
*H04B 7/14* (2006.01)
*H04B 7/00* (2006.01)
*H04B 17/02* (2006.01)
*H04W 52/14* (2009.01)
*H04W 52/16* (2009.01)
*H04W 52/26* (2009.01)
*H04W 52/28* (2009.01)

(56) References Cited

U.S. PATENT DOCUMENTS

| | | | |
|---|---|---|---|
| 2005/0185594 A1* | 8/2005 | Horneman et al. | 370/252 |
| 2006/0003787 A1* | 1/2006 | Heo et al. | 455/522 |
| 2006/0034226 A1* | 2/2006 | Gu et al. | 370/332 |
| 2006/0183428 A1* | 8/2006 | Heo et al. | 455/67.11 |
| 2006/0252450 A1 | 11/2006 | Wigard et al. | |
| 2007/0036104 A1* | 2/2007 | Bachl et al. | 370/329 |
| 2008/0254819 A1* | 10/2008 | Niwano et al. | 455/522 |

FOREIGN PATENT DOCUMENTS

| | | |
|---|---|---|
| EP | 1473849 A1 | 11/2004 |
| EP | 1594267 A | 11/2005 |
| EP | 1679803 A | 7/2006 |

OTHER PUBLICATIONS

International Search Report and Written opinion of the International Searching Authority received from PCT Application No. PCT/IB2007/004040, dated May 19, 2008, 8 pages.

3GPP TS 25.214 chapter 5.1.2.562.3 3GPP TS 25.214 V10.0.0 (Sep. 2010) Technical Specification 3rd Generation Partnership Project; Technical Specification Group Radio Access Network; Physical layer procedures (FDD) (Release 10).

Chinese Office Action and Search Report for corresponding CN patent Application No. 200780046052.0 mailed Jul. 24, 2012.

* cited by examiner

APPARATUS, METHOD AND COMPUTER PROGRAM PRODUCT PROVIDING UPLINK GAIN FACTOR FOR HIGH SPEED UPLINK PACKET ACCESS

RELATED APPLICATION

This application was originally filed as PCT Application No. PCT/IB2007/004040 filed on 20 Dec. 2007 which claims priority to U.S. application No. 60/875,965 filed on Dec. 20, 2006.

TECHNICAL FIELD

The exemplary and non-limiting embodiments of this invention relate generally to wireless communication systems, methods, devices and computer program products and, more specifically, relate to techniques for transmitting uplink data from a user equipment to a network node.

BACKGROUND

Various abbreviations that appear in the ensuing description are defined as follows:
3GPP $3^{rd}$ Generation Partnership Project
BTS base transceiver station
E-DCH enhanced dedicated channel
E-DPCCH E-DCH dedicated physical control channel
E-DPDCH E-DCH dedicated physical data channel
E-TFC E-DCH transport format combination
E-TFCS E-DCH transport format combination set
FDD frequency division duplex
HARQ hybrid automatic repeat request
HSUPA high speed uplink packet access
IE information element
MAC medium access control
NBAP Node B application part
Node B base station
RNC radio network controller
RRC radio resource control
SF spreading factor
UE user equipment
UMTS universal mobile terrestrial system
UTRA UMTS terrestrial radio access
UTRAN UMTS terrestrial radio access network
WCDMA wideband code division multiple access The following discussion relates to the 3GPP specification of UTRA, and more specifically to a WCDMA HSUPA (FDD Enhanced Uplink) feature that has been specified in 3GPP release 6, and even more specifically to the computation of uplink gain factors for HSUPA.

As currently specified in 3GPP release 6 (and release 7) the gain factor control is such that that the UE selects a transmit rate by performing E-TFC selection from the E-TFCS. The gain factor for E-DPCCH, and a set of reference gain factors (up to eight) for the E-DPDCH, namely the values, are signaled by the UTRAN. The E-DPDCH gain factors typically vary for each E-TFC. Up to 127 E-TFCs may exist and be used and, thus, for those E-TFCs which do not have reference gain factors signalled by the UTRAN computed gain factors must be produced by the UE and BTS using an equation defined in 3GPP TS 25.214 (Technical Specification Group Radio Access Network; Physical layer procedures (FDD)). Thus, for each E-DPDCH data rate there exists a specific network configured power offset between the E-DPCCH and the E-DPDCH.

The currently defined equation assumes that there is a linear relationship between the data rate and the E-DPDCH to DPCCH gain factor, i.e., if the data rate is doubled then the gain factor is increased so that also the power difference of the E-DPDCH to DPCCH is doubled. This assumption would remain valid if the DPCCH level was independent of the used data rate. However, in practice the DPCCH power level needs to be increased when the data rate increases and decreased when the data rate decreases. The E-DPDCH power level is fixed to the DPCCH power level with the data rate dependent gain factor. Thus, when a data rate changes the gain factor is changed, thereby changing the E-DPDCH power level. However, the data rate change results in a changed DPCCH level (in the same direction), thus amplifying the E-DPDCH power level change.

More specifically the gain factor of an E-DPDCH means the amplitude of the E-DPDCH signal in relation to the DPCCH signal. The power ratio is achieved by squaring the amplitude ratio. The relative power of all the E-DPDCHs over the DPCCH in a multi-code transmission can be achieved by then multiplying the power ratio of a single E-DPDCH by the number of E-DPDCHs in transmission. For example, if a spreading factor 2 is used for an E-DPDCH then it is considered as two spreading factor 4 E-DPDCHs in the gain factor computation, and the amplitude is then corrected by multiplying this with the square root of 2 in the actual transmission.

What is important to note is that the DPCCH level must be sufficient in order to be able to receive the E-DPDCH correctly, as the DPCCH provides the channel estimate required in the reception of the E-DPDCH.

More specifically, the currently defined equation results in the following behavior. A reference E-TFC ($j^{th}$ E-TFC) is used to calculate gain factors for E-TFCs producing higher data rates (E-TFCs j+1 to j+n). This results in E-TFCs j+1 to j+n adequate to obtain a correct power level, if the DPCCH level does not change as a function of data rate. For higher data rates (the E-TFCs j+1 to j+n) the DPCCH level is not sufficiently high to obtain a good channel estimate and, thus, the power control increases the DPCCH level which may result in an unnecessarily high E-DPDCH power level. As a result, cell capacity is wasted. A similar phenomenon can occur for lower data rate E-TFCs, where the DPCCH level is set too high and cell capacity is again wasted.

In short, the current approach is clearly not optimal in terms of cell capacity.

As currently specified, the gain factor of a E-TFC is calculated based on a reference E-TFC (with the gain factor signaled by the network) so that there is a linear relationship of the data rate difference to the power difference. The gain factors affect the signal amplitude, which has a squared impact on the power change since the equation has square roots. Moreover the equation ensures that the power difference over all the E-DPDCHs follows the same relation if multiple parallel E-DPDCHs are being transmitted. The gain factor is set per E-DPDCH, but the equation takes the number of E-DPDCHs into account as well if the reference E-TFC has a different number of E-DPDCHs as the one for which the gain factor is being computed. Multiple parallel E-DPDCHs are used to achieve higher data rates than what a single E-DPDCH can provide.

The current equation and definition thereof can be found in 3GPP TS 25.214, section 5.1.2.5B.2.3, and is as follows:

$\beta_{ed,ref}$ denotes the reference gain factor of the reference E-TFC. Let $L_{e,ref}$ denote the number of E-DPDCHs used for the reference E-TFC and $L_{e,i}$ denote the number of E-DPDCHs used for the i:th E-TFC. If SF2 is used, $L_{e,ref}$ and $L_{e,i}$ are the equivalent number of physical channels assuming SF4. Let $K_{e,ref}$ denote the transport block size of the reference E-TFC and $K_{e,i}$ denote the transport block size of the i:th E-TFC, where the mapping between the E-TFCI and the E-DCH transport block size is defined in 3GPP TS 25.321: "MAC protocol specification".

For the i:th E-TFC, the temporary variable $\beta_{ed,i,harq}$ is then computed as:

$$\beta_{ed,i,harq} = \beta_{ed,ref} \sqrt{\frac{L_{e,ref}}{L_{e,i}}} \sqrt{\frac{K_{e,i}}{K_{e,ref}}} \cdot 10^{\left(\frac{\Delta harq}{20}\right)} \quad (1)$$

For the various reasons discussed above, the use of this equation results in a non-optimum usage of cell capacity.

SUMMARY OF THE INVENTION

A first embodiment of the invention is an electronic device comprising: a radio apparatus configured to perform bidirectional communication operations in a wireless communications network; and a controller configured to determine a factor to be used by at least one other electronic device operative in the wireless communications network to determine a gain factor that relates a data signal transmitted by the at least one other electronic device in a data channel and a control signal transmitted by the at least one other electronic device in a control channel, and to operate the radio apparatus to transmit the factor.

A second embodiment of the invention is an electronic device comprising: a radio apparatus configured to perform bidirectional communication operations in a wireless communications network; and a controller configured to receive from the wireless communications network through the radio apparatus a factor; and to use the factor transmitted by the wireless communications network to determine a gain factor that relates a data signal to be transmitted by the electronic device in a data channel and a control signal transmitted by the electronic device in a control channel.

A third embodiment of the invention is an electronic device comprising: a radio apparatus configured to perform bidirectional communication operations in a wireless communications network; and a controller configured to receive from the wireless communications network through the radio apparatus a factor, the factor intended for use by at least one other electronic device operative in the wireless communications network to determine a gain factor that relates a data signal to be transmitted by the at least one other electronic device in a data channel and a control signal transmitted by the at least one other electronic device in a control channel; and to operate the radio apparatus to transmit the factor to the at least one other electronic device.

A fourth embodiment of the invention is a computer program product comprising a computer readable memory medium storing a computer program, the computer program configured to operate an electronic device in a wireless communications network, wherein when the computer program is executed the electronic device is configured to select a factor for use by at least one other electronic device operative in the wireless communications network in determining a gain factor that relates a data signal transmitted by the at least one other electronic device in a data channel and a control signal transmitted by the at least one other electronic device in a control channel; and to operate radio apparatus to transmit the factor to the at least one other electronic device.

A fifth embodiment of the invention is a computer program product comprising a computer readable memory medium storing a computer program, the computer program configured to operate an electronic device in a wireless communications network, wherein when the computer program is executed the electronic device is configured to receive from the wireless communications network a factor; and to use the factor transmitted by the wireless communications network to determine a gain factor that relates a data signal to be transmitted by the electronic device in a data channel and a control signal transmitted by the electronic device in a control channel.

A sixth embodiment of the invention is a method performed at a first electronic device operative in a wireless communications network, the method comprising: determining a factor to be used by a second electronic device operative in the wireless communications network to determine a gain factor that relates a data signal to be transmitted by the second electronic device in a data channel and a control signal transmitted by the second electronic device in a control channel; and transmitting the factor.

A seventh embodiment of the invention is a method comprising: receiving a factor from a wireless communications network at an electronic device operative in the wireless communications network; and operating the electronic device to use the factor to determine a gain factor that relates a data signal to be transmitted by the electronic device in a data channel and a control signal transmitted by the electronic device in a control channel.

DETAILED DESCRIPTION

Figure 1:
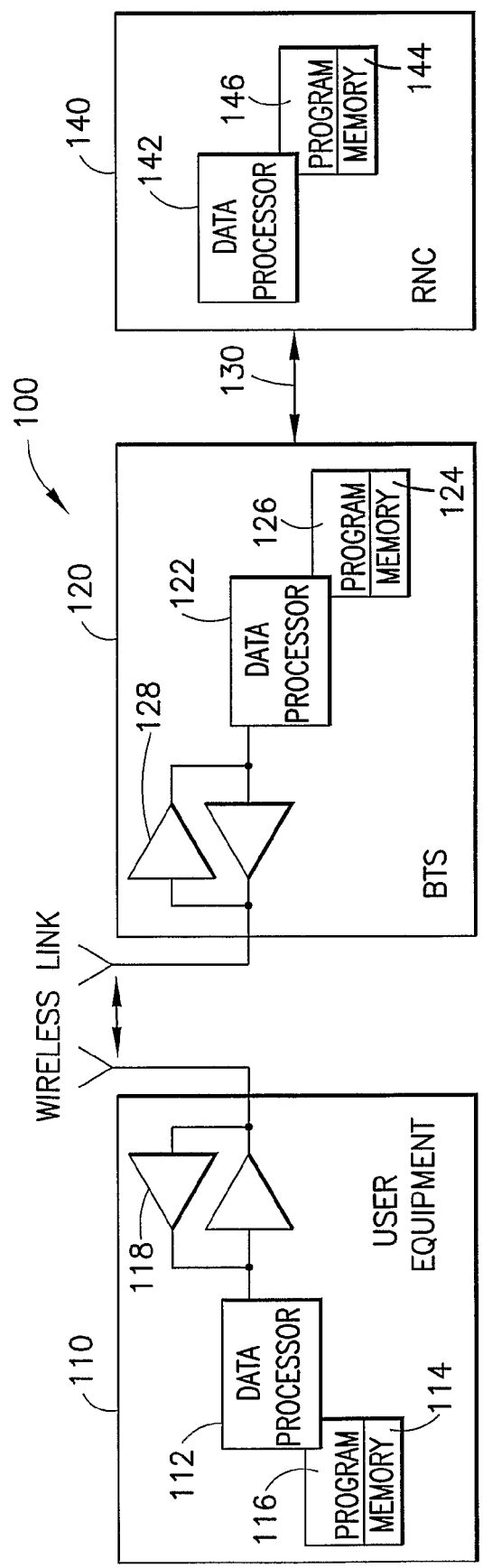
FIG. 1 shows a simplified block diagram of various electronic devices that are suitable for use in practicing the exemplary embodiments of this invention.

Reference is made first to FIG. 1 for illustrating a simplified block diagram of various electronic devices that are suitable for use in practicing the exemplary embodiments of this invention. In FIG. 1 a wireless network 100 is adapted for communication with a UE 110 via a BTS (base station) 120. The network 100 is assumed to include a network control element, which may be embodied as an RNC 140. The UE 110 includes a data processor (DP) 112, a memory (MEM) 114 that stores a program (PROG) 116, and a suitable radio frequency (RF) transceiver 118 for bidirectional wireless communications with the BTS 120, which also includes a DP 122, a MEM 124 that stores a PROG 126, and a suitable RF transceiver 128. The BTS 120 is coupled via a data path 130 to the RNC 140 that also includes a DP 142 and a MEM 144 storing an associated PROG 146. At least one of the PROGs 116, 126 and 146 is assumed to include program instructions that, when executed by the associated DP, enable the electronic device to operate in accordance with the exemplary embodiments of this invention, as will be discussed below in greater detail.

That is, the exemplary embodiments of this invention may be implemented at least in part by computer software executable by the DPs 112, 122 and 142, or by hardware, or by a combination of software and hardware.

In general, the various embodiments of the UE 110 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 114, 124 and 144 may be of any type suitable to the local technical environment and may be implemented using any suitable data storage technology, such as semiconductor-based memory devices, magnetic memory devices and systems, optical memory devices and systems, fixed memory and removable memory. The DPs 112, 122 and 142 may be of any type suitable to the local technical environment, and may include one or more of general purpose computers, special purpose computers, microprocessors, digital signal processors (DSPs) and processors based on a multi-core processor architecture, as non-limiting examples.

In one aspect, the exemplary embodiments of this invention provide a fine tuning factor that is added to the equation (1) shown above By using this factor it is possible to adjust the equation from the RNC 140 and the tendency to incorrectly estimate the required power can be compensated for.

In this aspect the improved equation is as follows:

$$\beta_{ed,i,harq} = \beta_{ed,ref}\sqrt{\frac{L_{e,ref}}{L_{e,i}}}\left(\frac{K_{e,i}}{K_{e,ref}}\right)^{Factor} \cdot 10^{\left(\frac{\Delta harq}{20}\right)} \quad (2)$$

An alternative notation for the same solution is if the Factor of equation (2) is equal to 0.5*Factor of the following equation (3). That is, the desired behavior can be achieved with both equations (2) and (3) with a different scaling of the Factor. The choice between equation (2) and equation (3) is simply notational.

$$\beta_{ed,i,harq} = \beta_{ed,ref}\sqrt{\frac{L_{e,ref}}{L_{e,i}}}\sqrt{\left(\frac{K_{e,i}}{K_{e,ref}}\right)^{Factor}} \cdot 10^{\left(\frac{\Delta harq}{20}\right)} \quad (3)$$

As is stated in Section 5.1.2.5B.2.3, "Computation of gain factors", the gain factor $\beta_{ed}$ of an E-TFC is computed based on the signaled gain factor $\beta_{ed,ref}$, the number of parallel E-DPDCHs $L_{e,ref}$ and the transport block size $K_{e,ref}$ for the corresponding reference E-TFC.

A reference E-TFCI$_{ref,m}$ from the M signaled reference E-TFCs is selected for each E-TFC$_i$ based on the rule below:

Let E-TFCI$_{ref,m}$ denote the E-TFCI of the m:th reference E-TFC, where m=1, 2, . . . , M and M is the number of signalled reference E-TFCs and E-TFCI$_{ref,1}$<E-TFCI$_{ref,2}$ <...<E-TFCI$_{ref,M}$. Let E-TFCI$_i$ denote the E-TFCI of the i:th E-TFC. For the i:th E-TFC:

if E-TFCI$_i$≥E-TFCI$_{ref,M}$, the reference E-TFC is the M:th reference E-TFC.

if E-TFCI$_i$<E-TFCI$_{ref,1}$, the reference E-TFC is the 1st reference E-TFC.

if E-TFCI$_{ref,1}$≤E-TFCI$_i$<E-TFCI$_{ref,M}$, the reference E-TFC is the m:th reference E-TFC such that E-TFCI$_{ref,m}$≤E-TFCI$_i$<E-TFCI$_{ref,m+1}$.

The HARQ offset $\Delta_{harq}$ is defined in subclause 4.2.1.3 of 3GPP TS 25.213: "Spreading and modulation (FDD)", and is dynamically selected based on the type of data being transmitted.

In the improved equation (2) the range of the Factor may be, as a non-limiting example, from 0.1 to 0.5 with a step of 0.02. The Factor may have also enumerated values, such as the non-limiting values: 0.2, 0.3, 0.4, and 0.5. The Factor is signaled by the RNC 140 to both the UE 110 and the BTS 120 using RRC and NBAP signaling, respectively.

Alternatively the Factor could be fixed by specification to a value less than 0.5. Note that a value of 0.5 corresponds to a square root and thus Factor=0.5 for equation (2) would result in the equation (1), and would give the same increase for the power as the relative increase in the data rate, which one would wish to avoid for at least the reasons discussed above. However, it may be desirable to include in the signaling the value of 0.5 for the Factor for backwards compatibility. Alternatively, the values may be multiplied by 2 if the equation (3) is employed.

In another aspect of the invention the following equation may be used:

$$\beta_{ed,i,harq} = \sqrt{\frac{L_{e,ref,1}}{L_{e,i}}} \cdot \sqrt{\left(\frac{\left(\frac{L_{e,ref,2}}{L_{e,ref,1}}\beta_{ed,ref,2}^2 - \beta_{ed,ref,1}^2\right)}{K_{e,ref,2} - K_{e,ref,1}}\right)}{(K_{e,i} - K_{e,ref,1}) + \beta_{ed,ref,1}^2}} \cdot 10^{\left(\frac{\Delta harq}{20}\right)} \quad (4)$$

In this aspect of the invention the RNC 140 may signal the UE 110 and BTS 120 with additional information to be used by the UE 110 in determining whether to use equation (1), (2), (3) or (4) in determining the gain factor.

Figure 3:
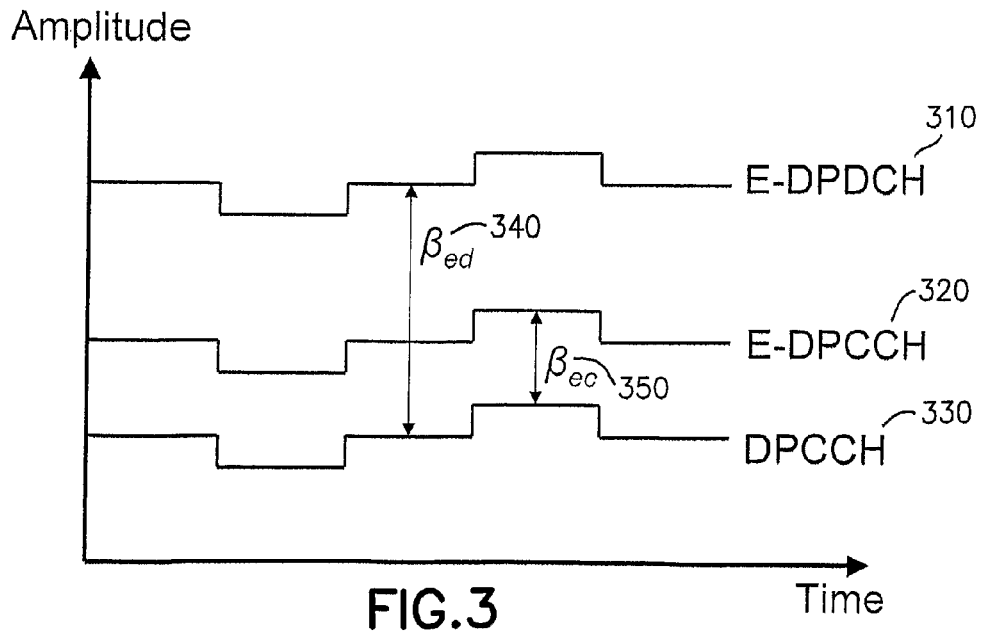
FIG. 3 is a graph of amplitude versus time, and is useful in understanding the usage of E-DCH gain factors in an uplink transmission.

FIG. 3 is useful in understanding the usage of E-DCH gain factors in an uplink transmission, as described above with reference to the improved equation. (2), as well as equation (4). The DPCCH 330 amplitude is changed slot-by-slot based on the power control commands sent by the base station. The E-DPCCH 320 amplitude is derived from the DPCCH amplitude with the gain factor $\beta_{ec}$ 350. The E-DPDCH 310 amplitude is derived from the DPCCH amplitude with the gain factor $\beta_{ed}$ 340. $\beta_{ec}$ 350 is a single parameter signaled by the network. $\beta_{ed}$ 340 is a parameter dependent on the data rate being transmitted. $\beta_{ed}$ 340 is calculated for each data rate based on references signaled by the network.

Figure 2:
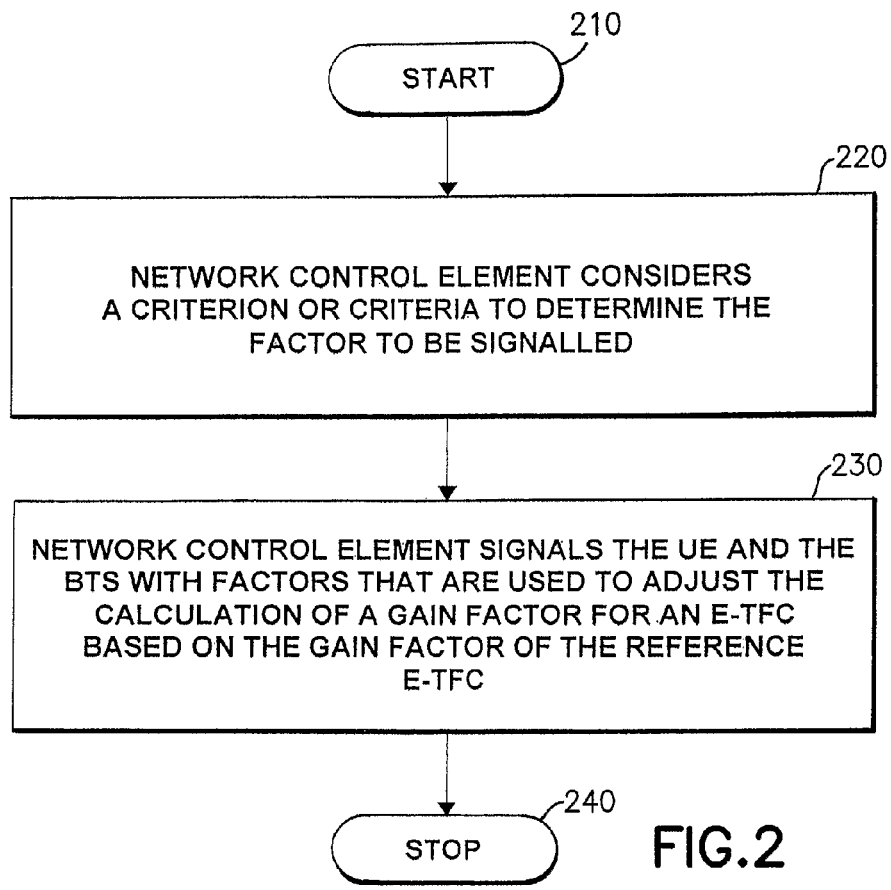
FIG. 2 is a logic flow diagram in accordance with the exemplary embodiments of this invention.

A method in accordance with the invention is depicted in FIG. 2, and starts at 210. It can thus be appreciated that the exemplary embodiments of this invention provide, as at 230 of FIG. 2, that a network control element, such as the RNC 140, signals the UE 110 and the BTS 120 with a Factor that is used to adjust the calculation of a gain factor for an E-TFC based on the gain factor of the reference E-TFC. The Factor in a simplest form is common for all reference E-TFCs, or in a more optimal form it may be signalled for each reference E-TFC separately.

Note that the RNC 140 may consider, as at 220 of FIG. 2, a criterion or criteria to determine the Factor value to be signalled. For example, one exemplary criterion that may be used is the data rate. For example, the Factor may be applied only if the data rate exceeds a certain level, or alternatively different data rate ranges may be associated with different Factor values. Another exemplary criterion that may be used can be based on a consideration of the modulation type (e.g., BPSK/16QAM), while another exemplary criterion may consider the number of parallel E-DPDCH codes. Two or more of these or other criterion may be considered when determining the value of the Factor to be signalled from the RNC 140.

It can be noted that the terms: data rate, E-TFC, TrBlk and Transport block that are used herein may be considered to reflect basically the same concept, as there is a one-to-one mapping between the E-TFC index and the transport block size, and a larger transport block size results in the use of a higher data rate during transmission.

The exemplary embodiments of this invention are thus preferably implemented in both the UE 110 and the BTS 120. The RNC 140 signals the new IEs to both, which take notice of the given values when the reference gain factors are defined.

At least one advantage that can be gained by the use of the exemplary embodiments of this invention is that the E-DPDCH gain factors can be defined to be more optimal over the entire E-TFC range and thus the system capacity is increased.

Based on the foregoing it should be apparent that the exemplary embodiments of this invention provide a method, apparatus and computer program product(s) to enable a gain factor calculation for an E-TFC to be based on a gain factor of a reference E-TFC in such a manner that the power over the E-DPDCHs of the E-TFC increases by lesser amount relative to the data rate of the E-TFC, when comparing to the reference E-TFC.

Based on the foregoing it should be apparent that the exemplary embodiments of this invention provide a method, apparatus and computer program product(s) to enable the RNC 140 to signal the UE 110 and the BTS 120 with a Factor used to adjust the calculation of a gain factor for an E-TFC based on the gain factor of the reference E-TFC. The value of the signalled Factor(s) may be selected in the RNC 140 based on at least one criterion.

Based on the foregoing it should be further apparent that the exemplary embodiments of this invention provide a method, apparatus and computer program product(s) to enable the UE 110 and the BTS 120 to receive signaling that specifies a Factor used in the equation (2) to adjust the calculation of a gain factor for an E-TFC based on the gain factor of the reference E-TFC.

The various blocks shown in FIG. 2 may be viewed as method steps, and/or as operations that result from operation of computer program code, and/or as a plurality of coupled logic circuit elements constructed to carry out the associated function(s).

Figure 4:
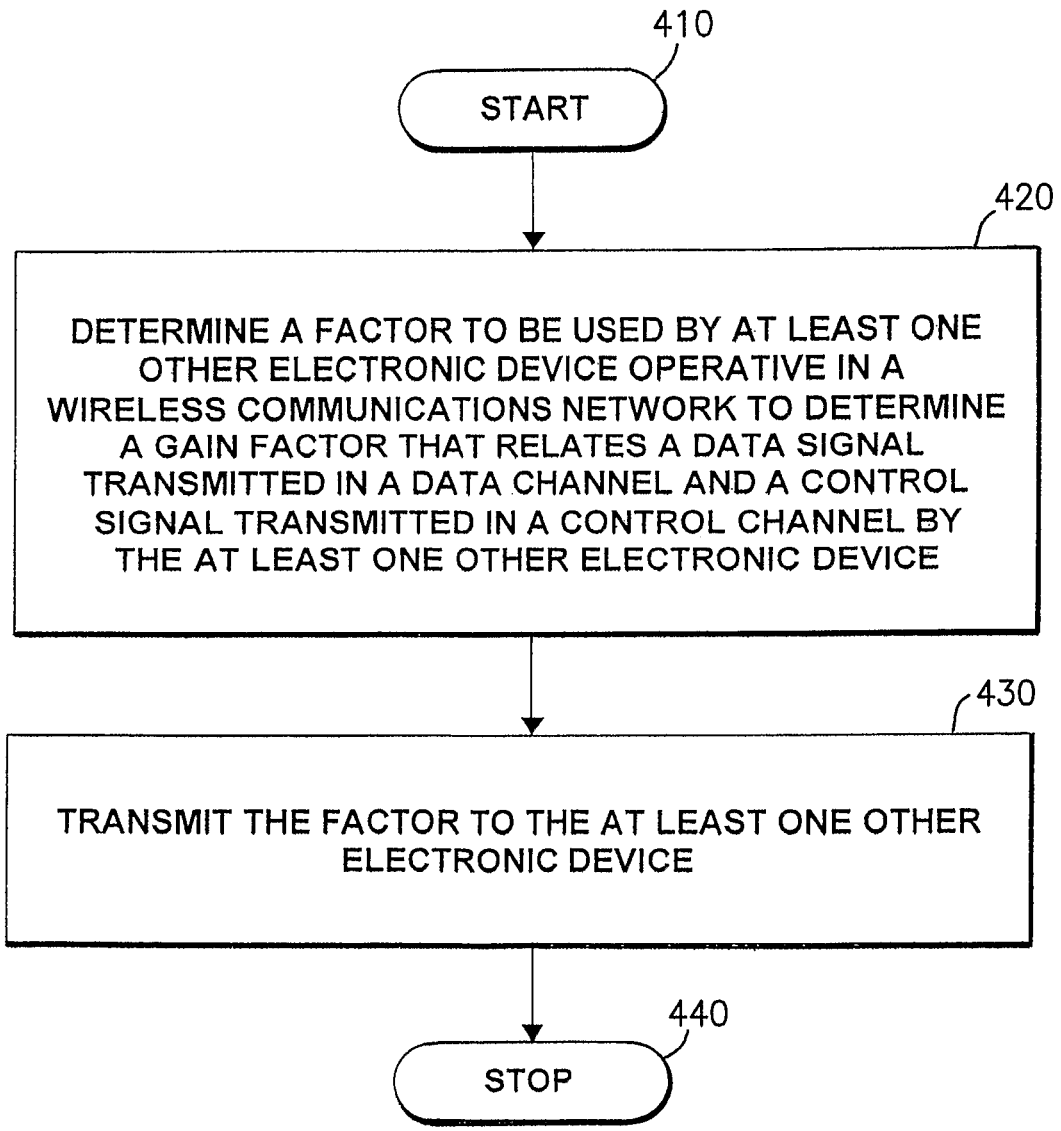
FIG. 4 is a flow chart depicting a method operating in accordance with the invention.
Figure 5:
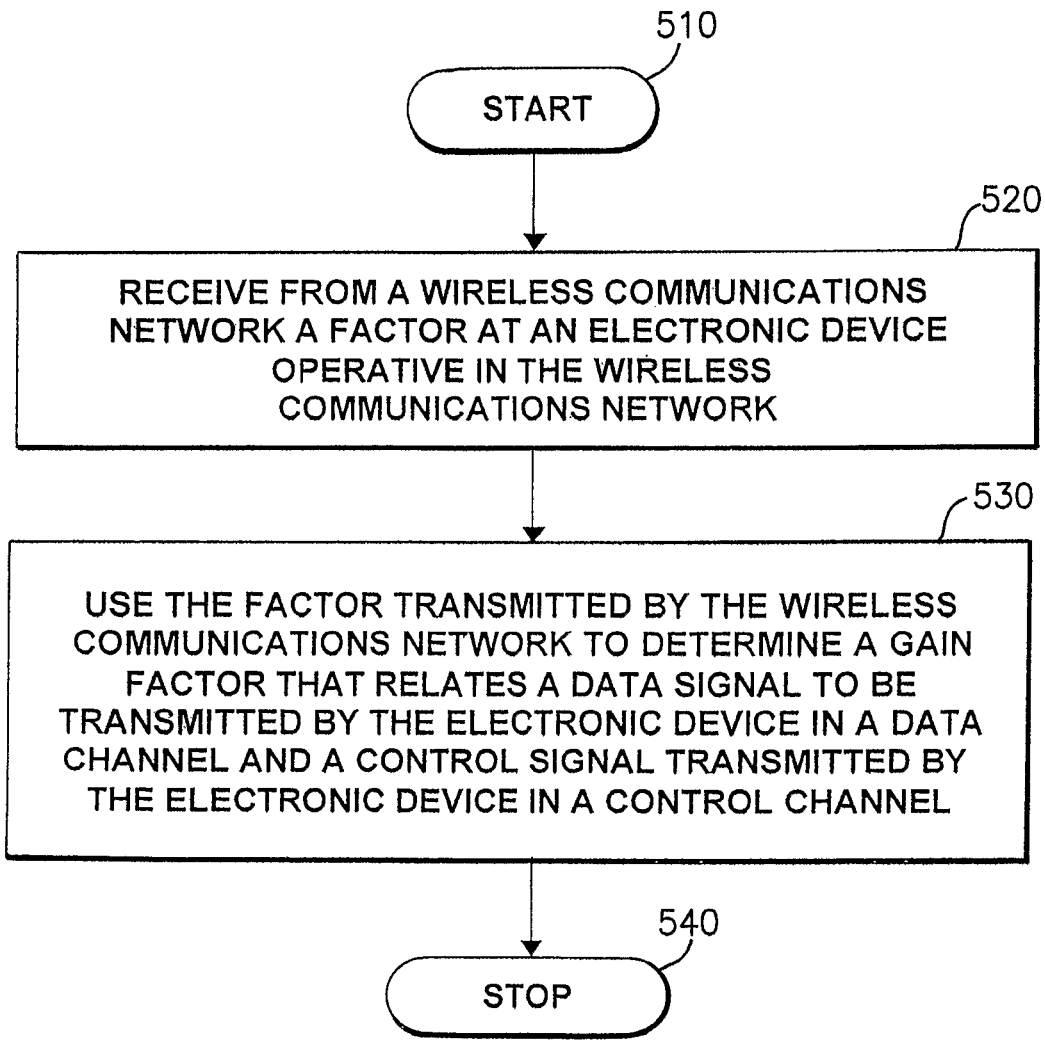
FIG. 5 is a flow chart depicting another method operating in accordance with the invention.

FIGS. 4 and 5 depict in summary form methods operating in accordance with the invention. FIG. 4 depicts a method that is practiced at, for example, a radio network controller 140 like that depicted in FIG. 2 operating in a HSUPA-capable UTRA network. The method starts at 410. Next, at 420, the radio network controller 140 determines a factor to be used by at least one other electronic device operative in a wireless communications network to determine a gain factor that relates a data signal transmitted in a data channel and a control signal transmitted in a control channel by the at least one other electronic device. Then, at 430, the radio network controller transmits the factor to the at least one other electronic device. The method stops at 440.

As indicated, the method depicted in FIG. 4 may be practiced in a HSUPA-capable UTRA network. In such a HSUPA-capable UTRA network, the data channel is an E-DPDCH and the control channel is a DPCCH. Control information contained in the control signal transmitted in the control channel DPCCH provides channel estimate information for use in receiving the data signal transmitted in the E-DPDCH.

In a variant of the method depicted in FIG. 4, the gain factor to be determined by the at least one other electronic device using the transmitted factor is intended for use with a particular E-TFC. In this variant, the at least one other electronic device is configured to determine the gain factor for use with the particular E-TFC using a reference E-TFC.

In another variant of the method depicted in FIG. 4, the radio network controller is further configured to determine the factor to be used by the at least one other electronic device based on a pre-determined criterion.

In a further variant of the method depicted in FIG. 4, the radio network controller 140 is further configured transmit information to the at least one other electronic device for use by the at least one other electronic device in selecting a formula to be used to determine the gain factor.

FIG. 5 is a flow chart depicting a method that may be practiced at, for example, user equipment in a HSUPA-capable UTRAN system. The method starts at 510. Next, at 520, the user equipment 110 receives from the wireless communications network a factor. Then, at 530, the user equipment 110 uses the factor transmitted by the wireless communications network to determine a gain factor that relates a data signal to be transmitted by the user equipment 110 in a data channel and a control signal transmitted by the electronic device in a control channel, where the control signal transmitted in the control channel carries information for using in receiving the data signal.

As indicated, the method depicted in FIG. 5 may be implemented in a HSUPA-capable UTRA network. In such a HSUPA-capable UTRA network the data channel is an E-DPDCH, and the control channel is a DPCCH. The control signal transmitted in the DPCCH may provide channel estimate information for use in receiving the data signal transmitted in the E-DPDCH.

In a variant of the method depicted in FIG. 5 practiced in a HSUPA-capable UTRA network, the method determines a gain factor for use with a particular E-TFC using a gain factor of a reference E-TFC. In a further variant, when determination of a gain factor is in response to an increase in data rate in data signals transmitted over the E-DPDCH, the factor is used in such a way in the gain factor determination so that an increase in power of the data signal transmitted over the E-DPDCH increases to a lesser extent than the increase in data rate associated with the particular E-TFC, when compared to the reference E-TFC.

In yet another variant of the method, the user equipment 110 receives additional information from the wireless communications network; and uses the additional information received from the wireless communications network to select a formula for use in determining the gain factor.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. The design of integrated circuits is by and large a highly automated process. Complex and powerful software tools are available for converting a logic level design into a semiconductor circuit design ready to be fabricated on a semiconductor substrate. Such software tools can automatically route conductors and locate components on a semiconductor substrate using well established rules of design, as well as libraries of pre-stored design modules. Once the design for a semiconductor circuit has been completed, the resultant design, in a standardized electronic format (e.g., Opus, GDSII, or the like) may be transmitted to a semiconductor fabrication facility for fabrication as one or more integrated circuit devices.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the HSUPA system, it should be appreciated that the exemplary embodiments of this invention are not limited for use with only this one particular type of wireless communication system, and that they may be used to advantage in other wireless communication systems.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. An apparatus comprising:
   at least one data processor; and
   at least one memory including computer program code, where the at least one memory and computer program code are configured, with the at least one data processor, to cause the apparatus at least to determine a fine tuning factor usable by at least one other apparatus operative in a wireless communications network to determine, in conjunction with a reference gain factor, a gain factor that relates a data signal transmitted by the at least one other apparatus in a data channel and a control signal transmitted by the at least one other apparatus in a control channel, the fine tuning factor being a factor used in a formula in conjunction with the reference gain factor to calculate the gain factor, where the usage of the fine tuning factor is data rate dependent; and
   to transmit the fine tuning factor to the at least one other apparatus;
   where the formula can be expressed as:

$$\beta_{ed,i,harq} = \beta_{ed,ref} \sqrt{\frac{L_{e,ref}}{L_{e,i}}} \sqrt{\left(\frac{K_{e,i}}{K_{e,ref}}\right)^{Factor}} \cdot 10^{\left(\frac{\Delta harq}{20}\right)},$$

where $\beta_{ed,ref}$ denotes the reference gain factor of a reference (ref) enhanced transport combination (E-TFC), $L_{e,ref}$ denotes a number of enhanced dedicated physical control channels (E-DPDCHs) used for the reference E-TFC, $L_{e,i}$ denotes the number of E-DPDCHs used for an i:th E-TFC, $K_{e,ref}$ denotes a transport block size of the reference E-TFC, $K_{e,i}$ denotes the transport block size of the i:th E-TFC, $\Delta harq$ is a hybrid automatic repeat request (HARQ) offset and Factor is the fine tuning factor.

2. The apparatus according to claim 1 wherein the control signal transmitted in the control channel carries information related to receipt of the data signal.

3. The apparatus according to claim 1 wherein the apparatus is part of a radio network controller.

4. The apparatus according to claim 1 wherein the at least one memory and computer program code are further configured, with the at least one data processor, to determine the fine tuning factor usable by the at least one other apparatus based at least in part on a pre-determined criterion.

5. The apparatus according to claim 1 wherein the apparatus is further configured to transmit the fine tuning factor to a base transceiver station.

6. An apparatus comprising:
   at least one data processor; and
   at least one memory including computer program code, where the at least one memory and computer program code are configured, with the at least one data processor, to cause the apparatus at least to receive from a wireless communications network a fine tuning factor used, in conjunction with a reference gain factor, to determine a gain factor, the gain factor relating a data signal transmitted by the apparatus in a data channel and a control signal transmitted by the apparatus in a control channel; and wherein the gain factor is based at least in part on the fine tuning factor, the fine tuning factor being a factor used in a formula in conjunction with the reference gain factor to calculate the gain factor, where the usage of the fine tuning factor is data rate dependent;
   where the formula can be expressed as:

$$\beta_{ed,i,harq} = \beta_{ed,ref} \sqrt{\frac{L_{e,ref}}{L_{e,i}}} \sqrt{\left(\frac{K_{e,i}}{K_{e,ref}}\right)^{Factor}} \cdot 10^{\left(\frac{\Delta harq}{20}\right)},$$

where $\beta_{ed,ref}$ denotes the reference am factor of a reference (ref) enhanced transport combination (E-TFC), $L_{e,ref}$ denotes a number of enhanced dedicated physical control channels (E-DPDCHs) used for the reference E-TFC, $L_{e,i}$ denotes the number of E-DPDCHs used for an i:th E-TFC, $K_{e,ref}$ denotes a transport block size of the reference E-TFC, $K_{e,i}$ denotes the transport block size of the i:th E-TFC, $\Delta harq$ is a hybrid automatic repeat request (HARQ) offset and Factor is the fine tuning factor.

7. The apparatus according to claim 6 wherein the control signal transmitted in the control channel carries information related to receipt of the data signal.

8. The apparatus according to claim 6 wherein the data channel is an enhanced dedicated physical data channel implemented in a UMTS terrestrial radio access network.

9. The apparatus according to claim 6 wherein the gain factor is usable with an enhanced dedicated channel transport format combination for transmission of the data signal.

10. The apparatus according to claim 9 wherein the at least one memory and computer program code are further configured, with the at least one data processor, to determine the gain factor usable with the enhanced dedicated channel transport format combination based at least in part on a gain factor of a reference enhanced dedicated channel transport format combination.

11. The apparatus according to claim 6 wherein the control channel comprises a dedicated physical control channel.

12. The apparatus according to claim 10 wherein the data channel is an enhanced dedicated physical data channel and wherein the control signal transmitted in the dedicated physical control channel provides channel estimate information related to receipt of the data signal transmitted in the enhanced dedicated physical data channel.

13. The apparatus according to claim 12 wherein the at least one memory and computer program code are further configured, with the at least one data processor, to determine the gain factor in response to an increase in data rate in data signals transmitted over the enhanced dedicated physical data channel; and to use the fine tuning factor in gain factor determination so that an increase in power of the data signal transmitted over the enhanced dedicated physical data channel increases to a lesser extent than the increase in data rate associated with the enhanced dedicated channel transport format combination, when compared to the reference enhanced dedicated channel transport format combination.

14. The apparatus according to claim 6, wherein the apparatus is at least part of user equipment.

15. An apparatus comprising:
at least one data processor; and
at least one memory including computer program code, where the at least one memory and computer program code are configured, with the at least one data processor, to cause the apparatus at least to receive from a wireless communications network a fine tuning factor, the fine tuning factor usable by at least one other apparatus operative in the wireless communications network to determine, in conjunction with a reference gain factor, a gain factor that relates a data signal transmitted by the at least one other apparatus in a data channel and a control signal transmitted by the at least one other apparatus in a control channel, the fine tuning factor being a factor used in a formula in conjunction with the reference gain factor to calculate the gain factor, where the usage of the fine tuning factor is data rate dependent; and
to transmit the fine tuning factor to the at least one other apparatus;
where the formula can be expressed as:

$$\beta_{ed,i,harq} = \beta_{ed,ref} \sqrt{\frac{L_{e,ref}}{L_{e,i}}} \sqrt{\left(\frac{K_{e,i}}{K_{e,ref}}\right)^{Factor}} \cdot 10^{\left(\frac{\Delta harq}{20}\right)},$$

where $\beta_{ed,ref}$ denotes the reference gain factor of a reference (ref) enhanced transport combination (E-TFC), $L_{e,ref}$ denotes a number of enhanced dedicated physical control channels (E-DPDCHs) used for the reference E-TFC, $L_{e,i}$ denotes the number of E-DPDCHs used for an i:th E-TFC, $K_{e,ref}$ denotes a transport block size of the reference E-TFC, $K_{e,i}$ denotes the transport block size of the i:th E-TFC, $\Delta harq$ is a hybrid automatic repeat request (HARQ) offset and Factor is the fine tuning factor.

16. The apparatus according to claim 15 wherein the apparatus is part of a base transceiver station.

17. A non-transitory computer-readable medium having computer-executable computer program code embodied thereon, the computer-executable computer program code, when executed by a processor, causes the processor to determine a fine tuning factor usable by an apparatus operative in a wireless communications network to determine a gain factor that relates a data signal transmitted by the apparatus in a data channel and a control signal transmitted by the apparatus in a control channel, the fine tuning factor being a factor used in a formula in conjunction with a reference gain factor to calculate the gain factor, where the usage of the fine tuning factor is data rate dependent; and to transmit to the apparatus the fine tuning factor;
where the formula can be expressed as:

$$\beta_{ed,i,harq} = \beta_{ed,ref} \sqrt{\frac{L_{e,ref}}{L_{e,i}}} \sqrt{\left(\frac{K_{e,i}}{K_{e,ref}}\right)^{Factor}} \cdot 10^{\left(\frac{\Delta harq}{20}\right)},$$

where $\beta_{ed,ref}$ denotes the reference gain factor of a reference (ref) enhanced transport combination (E-TFC), $L_{e,ref}$ denotes a number of enhanced dedicated physical control channels (E-DPDCHs) used for the reference E-TFC, $L_{e,i}$ denotes the number of E-DPDCHs used for an i:th E-TFC, $K_{e,ref}$ denotes a transport block size of the reference E-TFC, $K_{e,i}$ denotes the transport block size of the i:th E-TFC, $\Delta harq$ is a hybrid automatic repeat request (HARQ) offset and Factor is the fine tuning factor.

18. A non-transitory computer-readable medium having computer-executable computer program code embodied thereon, the computer-executable computer program code, when executed by a processor, causes the processor to receive at least one of a fine tuning factor from a wireless communications network at an apparatus operative in the wireless communications network; and to determine in conjunction with a reference gain factor a gain factor based at least in part on the fine tuning factor, the fine tuning factor being a factor used in a formula in conjunction with the reference gain factor to calculate the gain factor, where the usage of the fine tuning factor is data rate dependent, wherein the gain factor relates a data signal transmitted by the apparatus in a data channel and a control signal transmitted by the apparatus in a control channel;
where the formula can be expressed as:

$$\beta_{ed,i,harq} = \beta_{ed,ref} \sqrt{\frac{L_{e,ref}}{L_{e,i}}} \sqrt{\left(\frac{K_{e,i}}{K_{e,ref}}\right)^{Factor}} \cdot 10^{\left(\frac{\Delta harq}{20}\right)},$$

where $\beta_{ed,ref}$ denotes the reference gain factor of a reference (ref) enhanced transport combination (E-TFC), $L_{e,ref}$ denotes a number of enhanced dedicated physical control channels (E-DPDCHs) used for the reference E-TFC, $L_{e,i}$ denotes the number of E-DPDCHs used for an i:th E-TFC, $K_{e,ref}$ denotes a transport block size of the reference E-TFC, $K_{e,i}$ denotes the transport block size of the i:th E-TFC, $\Delta harq$ is a hybrid automatic repeat request (HARQ) offset and Factor is the fine tuning factor.

19. A method comprising:
determining a fine tuning factor usable by an apparatus operative in a wireless communications network to determine a gain factor that relates a data signal transmitted by the apparatus in a data channel and a control signal transmitted by the apparatus in a control channel, the fine tuning factor being a factor used in a formula in conjunction with a reference gain factor to calculate the gain factor, where the usage of the fine tuning factor is data rate dependent; and
transmitting the fine tuning factor to the apparatus;

where the formula can be expressed as:

$$\beta_{ed,i,harq} = \beta_{ed,ref} \sqrt{\frac{L_{e,ref}}{L_{e,i}}} \sqrt{\left(\frac{K_{e,i}}{K_{e,ref}}\right)^{Factor}} \cdot 10^{\left(\frac{\Delta harq}{20}\right)},$$

where $\beta_{ed,ref}$ denotes the reference gain factor of a reference (ref) enhanced transport combination (E-TFC), $L_{e,ref}$ denotes a number of enhanced dedicated physical control channels (E-DPDCHs) used for the reference E-TFC, $L_{e,i}$ denotes the number of E-DPDCHs used for an i:th E-TFC, $K_{e,ref}$ denotes a transport block size of the reference E-TFC, $K_{e,i}$ denotes the transport block size of the i:th E-TFC, $\Delta harq$ is a hybrid automatic repeat request (HARQ) offset and Factor is the fine tuning factor.

20. A method comprising:

receiving a fine tuning factor from a wireless communications network at an apparatus operative in a wireless communications network; and determining a gain factor based at least in part on the fine tuning factor, wherein the gain factor relates a data signal transmitted by the apparatus in a data channel and a control signal transmitted by the apparatus in a control channel, the fine tuning factor being a factor used in a formula in conjunction with a reference gain factor to calculate the gain factor, where the usage of the fine tuning factor is data rate dependent;

where the formula can be expressed as:

$$\beta_{ed,i,harq} = \beta_{ed,ref} \sqrt{\frac{L_{e,ref}}{L_{e,i}}} \sqrt{\left(\frac{K_{e,i}}{K_{e,ref}}\right)^{Factor}} \cdot 10^{\left(\frac{\Delta harq}{20}\right)},$$

where $\beta_{ed,ref}$ denotes the reference gain factor of a reference (ref) enhanced transport combination (E-TFC), $L_{e,ref}$ denotes a number of enhanced dedicated physical control channels (E-DPDCHs) used for the reference E-TFC, $L_{e,i}$ denotes the number of E-DPDCHs used for an i:th E-TFC, $K_{e,ref}$ denotes a transport block size of the reference E-TFC, $K_{e,i}$ denotes the transport block size of the i:th E-TFC, $\Delta harq$ is a hybrid automatic repeat request (HARQ) offset and Factor is the fine tuning factor.

* * * * *

UNITED STATES PATENT AND TRADEMARK OFFICE
CERTIFICATE OF CORRECTION

PATENT NO. : 8,885,611 B2  
APPLICATION NO. : 12/519754  
DATED : November 11, 2014  
INVENTOR(S) : Mella et al.

Page 1 of 1

It is certified that error appears in the above-identified patent and that said Letters Patent is hereby corrected as shown below:

In the Claims  
Claim 6, col. 10, line 42 "am" should be deleted and --gain-- should be inserted.

Signed and Sealed this  
Twenty-fourth Day of February, 2015

Michelle K. Lee  
*Deputy Director of the United States Patent and Trademark Office*